Nov. 10, 1936.  A. A. KASARJIAN  2,060,219
SPARK PLUG AND METHOD OF MAKING THE SAME
Filed Dec. 30, 1932
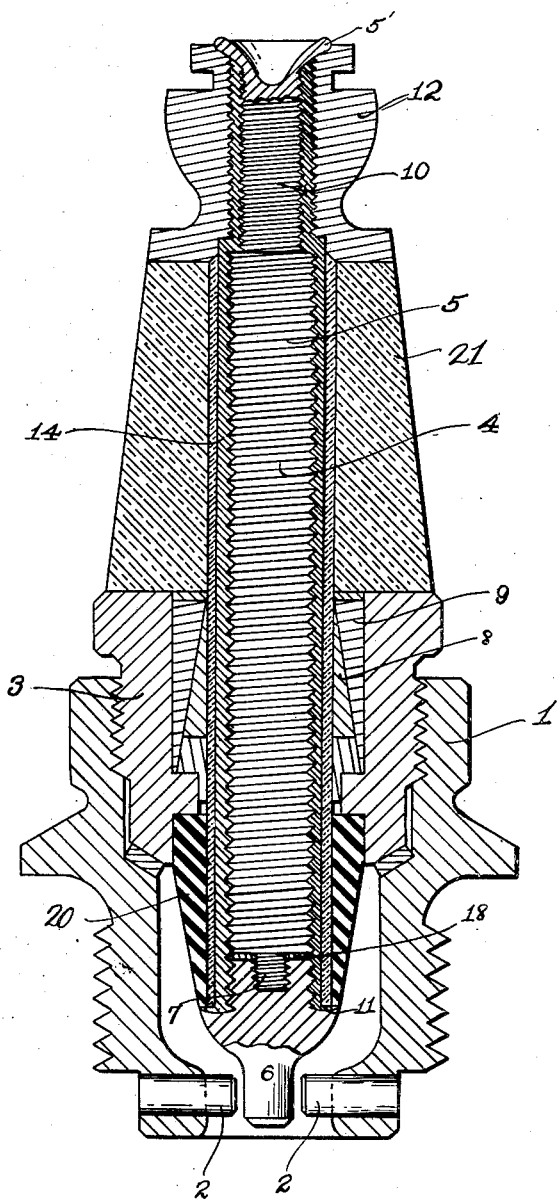
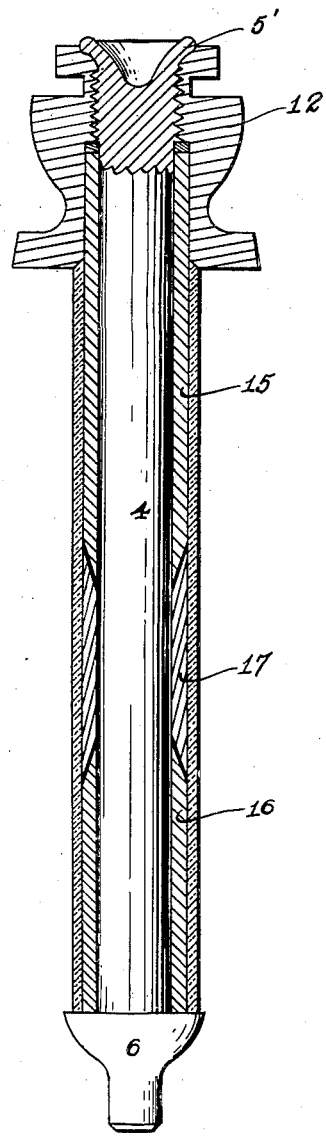
INVENTOR.
Armen A. Kasarjian
BY
ATTORNEY.

Patented Nov. 10, 1936

2,060,219

UNITED STATES PATENT OFFICE 2,060,219

SPARK PLUG AND METHOD OF MAKING THE SAME

Armen A. Kasarjian, Jackson Heights, N. Y., assignor to Mosler Ignition Corporation, New York, N. Y., a corporation of New York Application December 30, 1932, Serial No. 649,456

5 Claims. (Cl. 123—169)

This invention relates to spark plugs and is directed more particularly to a plug so constituted as to withstand high temperatures and high compression without overheating, this being accomplished according to the fundamental principle of this invention, by the provision of novel means for transferring away and distributing the heat from the plug.

In spark plugs and especially those used in aircraft engines, it is imperative that the firing end of the central electrode of the plug, which is directly exposed to the heat of the combustion charge be made of material which will withstand high temperatures without scaling or corrosion. It is well recognized, however, that metals which have the capacity of withstanding such heat are relatively poor conductors, so that in ignition plugs for aviation which embody a central electrode of heat resisting material it is common for such electrode to become heated to such extent as to be incandescent and cause pre-ignition of the fuel. Obviously pre-ignition will develop an even greater heat, results in a loss of power and is undesirable in an aviation engine.

It has been heretofore suggested as a possible solution for this difficulty to make the central electrode of the plug of two materials. For example, that portion of the plug which is adapted for direct contact with the heat of the explosive charge and which is known in the art as the spindle head, is made of heat resisting material, while the spindle shank which forms the remainder of the electrode is made from a material susceptible of greater heat conductivity, such, for example, as cold rolled steel, the head and shank being generally welded together. This arrangement is less apt to produce an incandescent condition of the spindle head in operation, but does not solve the problem satisfactorily as the spindle head may even with this arrangement become heated to such extent as to cause pre-ignition to which I have referred. If it were possible to make the spindle head of a heat resisting metal and the spindle shank of copper, the best known heat conducting commercial metal, the problem would be relatively simple. Copper, however, does not possess sufficient tensile strength especially at elevated temperature and the process of welding it to an alloy suitable for spindle head presents a difficult problem.

My experience with spark plugs has convinced me that it is absolutely essential for the proper functioning of the plug under all conditions that the excessive heat absorbed by the spindle head be carried away and rapidly dissipated and I have reached the conclusion as a result of long experience and exhaustive experimentation that this cannot be satisfactorily accomplished by making the spindle of any particular material. On the contrary, I have found that very good results may be obtained by employing a spindle head of poor conductivity but of high heat resistance, by associating with said heated spindle of higher heat conductivity, preferably by threading them together and by encasing said spindle within an envelope of material of high heat conductivity. Even when the sleeve is encased in an envelope of high heat conductivity, the amount of heat which must necessarily be carried off requires for the best results a greater heat transferring surface than the cylindrical face of a spindle shank.

I find that for the best results the shank should be serrated or corrugated so as to impart to the exposed surface of said shank a greatly increased surface area susceptible of transmitting heat to the envelope surrounding the same.

I further find in practice that entirely satisfactory results can be obtained by applying the envelope as by an electroplating process, so as to enclose the relatively poor heat conducting shank within an envelope of high conductivity, such, for example, as afforded by copper and providing at the same time between the envelope and the shank a greatly increased surface contact adapted to transmit the heat rapidly into the copper envelope which, in turn, transmits it to the cooler portion of the plug for rapid dissipation.

While the plated envelope arrangement which I have described constitutes the preferred form of this invention, I also have found that if it is desired to use a tubular envelope about the shank, I may use to advantage an envelope composed of different materials so disposed as to form a tight seal during plug assembly and at the same time provide for the conducting away of detrimental heat.

Features of the invention, other than those adverted to, will be apparent from the hereinafter detailed description and claims, when read in conjunction with the accompanying drawing.

The accompanying drawing illustrates different practical embodiments of the invention, but the constructions therein shown are to be understood as illustrative, only, and not as defining the limits of the invention.

Figure 1 is a central section of a plug embodying the invention in its preferred form.

Figure 2 is a like section of a central electrode structure embodying a modified form of the invention.

The plug structure of this invention may be included in any conventional plug construction so far as the porcelain, mica or base structure is concerned. However, for the purpose of illustration, I have shown the same in Figure 1 of the drawing as incorporated in a well known plug of the aviation type.

In this figure, 1 designates the shell of the plug provided with grounded electrodes 2. 3 is the bushing which holds the central electrode in place and this central electrode is designated generally by the reference character 4. A shank 5 of the electrode has a spindle head 6 threaded thereto as indicated as at 7. The method of holding the central electrode within the shell in the structure shown in Figure 1 is substantially that illustrated in the Mosler Patent No. 1,588,489 dated June 15th, 1926, and in which patent the central electrode is secured in place by cooperating annular wedges 8 and 9 which firmly support and mount the central electrode and its associated parts upon the bushing 3 which is thereupon screwed into the shell 1.

Carrying out the present invention with a plug of this character, as well as any other conventional plug structure, the spindle shank 5 is serrated or corrugated. In practice, I find it convenient to produce such corrugations by a threading operation. In other words, the shank 5 is threaded from one end to the other, so as to increase its exposed surface area. The shank is shown as stepped at its upper end to provide a binding post portion 10 for an ignition lead and this portion is also threaded. Similarly the upper portion of the spindle head is threaded adjacent its points of attachment with the shank and the upper surface of the head 11 is slightly convex or dished as shown.

In the manufacture of the plug, I proceed after assembling the threaded shank and the threaded head to subject the threaded portions of these parts to a plating operation preferably a copper plating, which serves to deposit hard copper on the threads and in the concave cup at the top of the head. The plating operation is carried on to such extent as to deposit an envelope of appreciable thickness so as to impart thereto a copper body 14 of sufficient mass as to efficiently conduct appreciable heat. The employment of the cupped or concave seat 11 is to permit subsequent accurate machining of the copper deposited on its head to insure a tight seat of the superimposed plug part, while insuring the presence of copper at its seat after the machining operation. After the central electrode is copper plated as stated, the plating on the post portion 10 is exteriorly threaded to receive the terminal nut 12.

In practice, the spindle head is made of any appropriate heat resisting material, such as Alleghany steel, or other material used for this purpose. The shank may be conveniently made of cold rolled steel which is cheap and at the same time satisfactory and the plating 14 is preferably a copper plating, although it may be a plating of any other material which has a high conductivity for heat. When the nut 12 is screwed upon the copper threads of the post plating, I prefer, in order to make the structure rigid and permanent to spread the upper end of the post and plating into the countersunk upper end of the terminal nut 12 as shown at 5', thereby locking the parts together on the part 3. The insulating means which is interposed between the spindle head 6 and the bushing 3 is indicated at 20 in the drawing, while the insulating means which is interposed between the bushing 3 and the terminal nut 12, which constitutes the compression member, is indicated by the reference character 21. These insulating means may be of any suitable material, but are preferably of mica.

When a plug is assembled in the manner stated, heat from the burning motive fuel and which is taken up or absorbed by the spindle head 6, is transmitted by said head to the shank 5 and also to the copper plating within the cup 11.

By virtue of the relatively extensive surface contact between the spindle and the copper plating, the heat is readily transmitted from the spindle shank to said plating, while the high conductivity of the plating carries the heat rapidly in an upward direction and dissipates it through and at the cooler parts of the plug.

I have referred to the plating of the spindle shank with a metal of high heat conductivity. This is the preferred practical form of the invention. It is economical and highly efficient in the carrying out of its intended functions. I may, however, obtain similar results, though probably not as high efficiency, by making the plated element in the form of a drawn tubular sleeve of copper and interiorly threading the sleeve so that it can be screwed on to the threads of the spindle stem. This arrangment will function similarly to the preferred form of the invention, although the sleeve will not have as close a metallic contact with the metal of the spindle stem and consequently will not transfer the heat as quickly.

This failure to get complete metal contact throughout the juxtaposed surfaces of the high and low conducting parts and may be overcome to some extent by brazing or veneering a sleeve of metal of high conductivity to the spindle shank, so as to give a more complete and intimate contact between the surfaces of these parts in order to facilitate the transfer of heat between them.

In Figure 2 of the drawing I have shown a modified form of the invention in which construction the spindle shank 4 is housed within a sleeve composed of a plurality of sections, the upper and lower sections designated 15 and 16 are of copper while the intermediate section 17 is of brass. The brass section 17 is positioned to extend through the wedges 8 and 9 and is utilized instead of copper at this point to permit these wedges to be forced under greater pressure against the wrapping of cigaret mica around the electrode in order to give a tight joint. When the copper plating is employed, the plating is fairly thin, so that the copper, which is relatively hard will not flow under the pressure of the wedges, but in employing a sleeve construction where the metal may be thicker or softer, the brass section may be utilized to advantage to withstand the great pressures to which the sleeve will be subjected.

In this construction of Figure 2, the sleeve sections are shown as having a sliding fit with the spindle stem, although they may be threaded thereon or may be brazed or veneered thereto.

It may be here noted that to facilitate the transmission of heat from the spindle head to the spindle in each case where these parts are screwed together, a copper washer 18 is preferably interposed between the parts as shown in Figure 1.

The plug of the present invention when constructed in any of the ways which I have described has proven to operate with marked efficiency as compared with prior practice and this is particularly true of the plated shank plug which tests have proven to be a relatively cool plug even when used with aviation engines having high pressure.

In the accompanying drawing, I have illustrated the preferred forms of the present invention, but the invention is to be understood as fully commensurate with the appended claims.

Having thus fully described the invention, what I claim as new and desire to secure by Letters Patent, is:

1. The method of making a spark plug electrode, which consists in forming a spindle head with a cupped shoulder, then attaching to said head a threaded spindle with the axis of the spindle coaxial with the cupped shoulder of the head, then electrolytically depositing copper in the threads of the spindle and in the cupped shoulder of the head, and thereafter surfacing the copper in the cupped shoulder of the head to form a seat substantially flush with the outer periphery of said cupped shoulder.

2. In a spark plug, a metallic central electrode comprising a spindle provided at one end with a spindle head having a shoulder, a compression member cooperating with the other end of the spindle, insulating elements interposed between the spindle head and the compression member and tightly clamped in an axial direction between them, and a metallic envelope embracing said spindle between the shoulder of the spindle head and the compression member and forming a conductive sleeve interposed between the spindle and the insulating elements, said conductive sleeve being composed of metal of higher conductivity than the metal of the spindle and electrolytically bonded to the spindle and said insulating elements enveloping the metal of the sleeve to protect it from direct contact with burning motive fuel when the plug is in use.

3. In a spark plug, a metallic central electrode comprising a threaded spindle provided at one end with a spindle head having a shoulder, a compression member cooperating with the other end of the spindle, insulating elements interposed between the spindle head and the compression member and tightly clamped in an axial direction between them, and a metallic envelope embracing said threaded spindle between the shoulder of the spindle head and the compression member and forming a conductive sleeve interposed between the spindle and the insulating elements, said conductive sleeve being composed of metal of higher conductivity than the metal of the spindle and electrolytically bonded to the spindle and said insulating elements enveloping the metal of the sleeve to protect it from direct contact with burning motive fuel when the plug is in use.

4. In a spark plug, a cylindrical metal bushing, a central electrode extending coaxially through the bushing and free from contact therewith, said electrode comprising a spindle provided at its inner end with a spindle head and having a compression member associated with its outer end, insulating means interposed between the spindle head and the bushing, additional insulating means interposed between the bushing and the compression member, said compression member cooperating with the spindle and spindle head to clamp the aforesaid insulating means and the bushing between the compression member and the spindle head, a metallic envelope of metal having higher heat conductivity than the spindle and closely embracing and electrolytically bonded to the spindle and extending at least through the bushing in an axial direction, an insulating sleeve embracing the metallic envelope, and interposed between the metallic envelope and the said insulating means and bushing, and cross axial heat conductive wedging means interposed between the bushing and the insulating sleeve to form a gas tight joint between the bushing and the spindle in the zone of the wedging means.

5. In a spark plug, a cylindrical metal bushing, a central electrode extending coaxially through the bushing and free from contact therewith, said electrode comprising a spindle provided at its inner end with a spindle head and having a compression member associated with its outer end, insulating means interposed between the spindle head and the bushing, additional insulating means interposed between the bushing and the compression member, said compression member cooperating with the spindle and spindle head to clamp the aforesaid insulating means and the bushing between the compression member and the spindle head, a metallic envelope of metal having higher heat conductivity than the spindle and closely embracing and electrolytically bonded to the spindle and extending at least through the bushing in an axial direction, and an insulating sleeve embracing the metallic envelope and interposed between the metallic envelope and the said insulating means and bushing.

ARMEN A. KASARJIAN.